(12) United States Patent
Wu et al.

(10) Patent No.: US 7,546,634 B2
(45) Date of Patent: *Jun. 9, 2009

(54) ENCRYPTION REMOVABLE STORAGE SYSTEM

(76) Inventors: Victor Chuan-Chen Wu, 21055 Lauretta Dr., Cupertino, CA (US) 95014; Bill Kwong, 20363 Leutar Ct., Saratoga, CA (US) 95070

( * ) Notice: Subject to any disclaimer, the term of this patent is extended or adjusted under 35 U.S.C. 154(b) by 925 days.

This patent is subject to a terminal disclaimer.

(21) Appl. No.: 11/101,586

(22) Filed: Apr. 8, 2005

(65) Prior Publication Data
US 2006/0230440 A1    Oct. 12, 2006

(51) Int. Cl.
*H04L 9/32* (2006.01)
(52) U.S. Cl. .................... 726/9; 713/194; 361/737; 361/752; 711/100
(58) Field of Classification Search ................. 713/160, 713/189, 192, 194; 726/9; 711/100; 361/685, 361/752, 730, 737, 748
See application file for complete search history.

(56) References Cited
U.S. PATENT DOCUMENTS
5,761,698 A * 6/1998 Combs ................. 711/100

| | | | | |
|---|---|---|---|---|
| 6,353,870 B1 * | 3/2002 | Mills et al. | ................. | 710/301 |
| 7,005,733 B2 * | 2/2006 | Kommerling et al. | ....... | 257/679 |
| 7,184,274 B2 * | 2/2007 | Wu et al. | ................. | 361/752 |
| 7,269,738 B1 * | 9/2007 | Kivimaki | ................. | 713/189 |
| 2003/0060185 A1 * | 3/2003 | Fisher et al. | ................. | 455/344 |

\* cited by examiner

*Primary Examiner*—Nasser G Moazzami
*Assistant Examiner*—Shanto M Abedin
(74) *Attorney, Agent, or Firm*—Ming Chow; Sinorica, LLC

(57) ABSTRACT

An encryption removable storage system that enables different types of storage devices to be conveniently added or removed from a cradle of a computer or equipment and with data encryption/decryption ability, which comprising: an enclosure portion that can slide in and out of said cradle portion, having a hollow space for containing said storage devices and providing connection of the electrical signals of said storage devices; and a bridge portion that can be positioned inside said enclosure portion with the ability of translating a first interface into a second interface and executing data encryption/decryption function, wherein, said first interface is different to said second interface either in signals type or physical connecting type.

10 Claims, 4 Drawing Sheets

ENCRYPTION REMOVABLE STORAGE SYSTEM

BACKGROUND OF THE INVENTION

1. Field of the Invention

The present invention relates to an encryption removable storage system that enables different types of storage devices to be conveniently added or removed from a cradle of a computer or equipment and with data encryption/decryption ability, so as to achieve the goal of protecting the data of the storage devices.

2. Description of Related Art

A standard desktop computer typically provides one or more compartments (also called drive bays) for the installation of 5¼ inch or 3½ inch storage devices such as CD ROM, DVD ROM or CDRW drive, hard drive, ZIP, SuperDisk etc. Because of space limitation, many desktop computers, Kiosk or computing equipment have only one to two drive bays, thus limiting the number of devices that can be installed. Once a storage device is installed into the drive compartment or drive bay, replacement or upgrade of the storage device requires careful disassembling and reassembling of the computer by a trained technician.

Data storage devices primary fall into two categories: the removable storage and hard disk storage. These two types of data storage devices offer different advantages depending on the type of applications.

In the removable storage, the storage media can be replaced as more storage space is needed. Cost of the media is relatively inexpensive. But the data transfer rate for removable storage devices in general are much slower than hard disk storage. Thus the removable storage is great for data archiving. To access the data stored on a removable storage media, the computer must have a compatible drive that can read the data from the media. Example, a CDRW drive or CD-ROM drive is needed to access the data on a CDRW media, a DVD drive is needed to access data on a DVD media, a 250 MB-ZIP drive is needed to access data on a 250 MB ZIP media. As a result, in order for a computer to access data on a variety of removable media, it must be equipped with various types of drives.

In the case of hard disk storage, the media and the drive are integrated together. With this design, the data transfer rate for hard drive is much faster than the removable storage. Thus hard disk is great for storing program files, for storing data that are accessed all the time and for streaming video application. Since the hard drive and the storage media are all integrated in one unit, the computer can access the data stored in a hard drive by connecting up the hard disk controller cable and the power cable from inside a computer to the hard drive. But this way of connecting a hard drive to a computer usually requires opening up the computer and technical skill.

External hard drive solves the problem of connecting a drive to a computer without opening up the computers. The external hard drives attach to a computer via one of the common I/O ports on a computer: USB, Firewire or PCMCIA. Since all the external hard drives are constructed with an enclosure to house the hard drive and the interface electronics. The additional cost of the housing and interface electronics make the external hard drive much more expensive than an internal IDE drive. So when an external hard drive capacity is used up, the user will have to purchase another external hard drive in order to have more data storage capacity. In addition, the external hard drive with this traditional design also limits its use to a single interface. If you have an external USB hard drive, a computer that has no USB port will not be able to use the hard drive.

However, the prior art external hard drives do not support data encryption/decryption function, so the external hard drives can be added into any cradle device of a computer or equipment, and the data of the hard drives can be easily access without any difficulty; therefore, the vital information of a company or personal of the hard drives may be stolen due to use the external hard drives without support data encryption/decryption function.

Therefore, the solution or invention in this patent deals with an encryption removable storage system that enables different types of storage devices to be conveniently added or removed from a cradle of a computer or equipment and with data encryption/decryption ability.

SUMMARY OF THE INVENTION

The object of the present invention is to provide an encryption removable storage system that different types of storage devices to be conveniently added or removed from a cradle of a computer or equipment and with data encryption/decryption ability, so as to achieve the goal of protecting the data of the storage devices.

According to one non-limited embodiment of the present invention, the encryption removable storage system comprises: an enclosure portion that can slide in and out of said cradle portion, having a hollow space for containing said storage devices and providing connection of the electrical signals of said storage devices; and a bridge portion that can be positioned inside said enclosure portion with the ability of translating a first interface into a second interface and executing data encryption/decryption function, wherein, said first interface is different to said second interface either in signals type or physical connecting type.

BRIEF DESCRIPTION OF THE DRAWINGS

The present invention can be more fully understood by reference of the following description and accompanying drawings, in which.

DETAILED DESCRIPTION OF THE PREFERRED EMBODIMENTS

Figure 1:
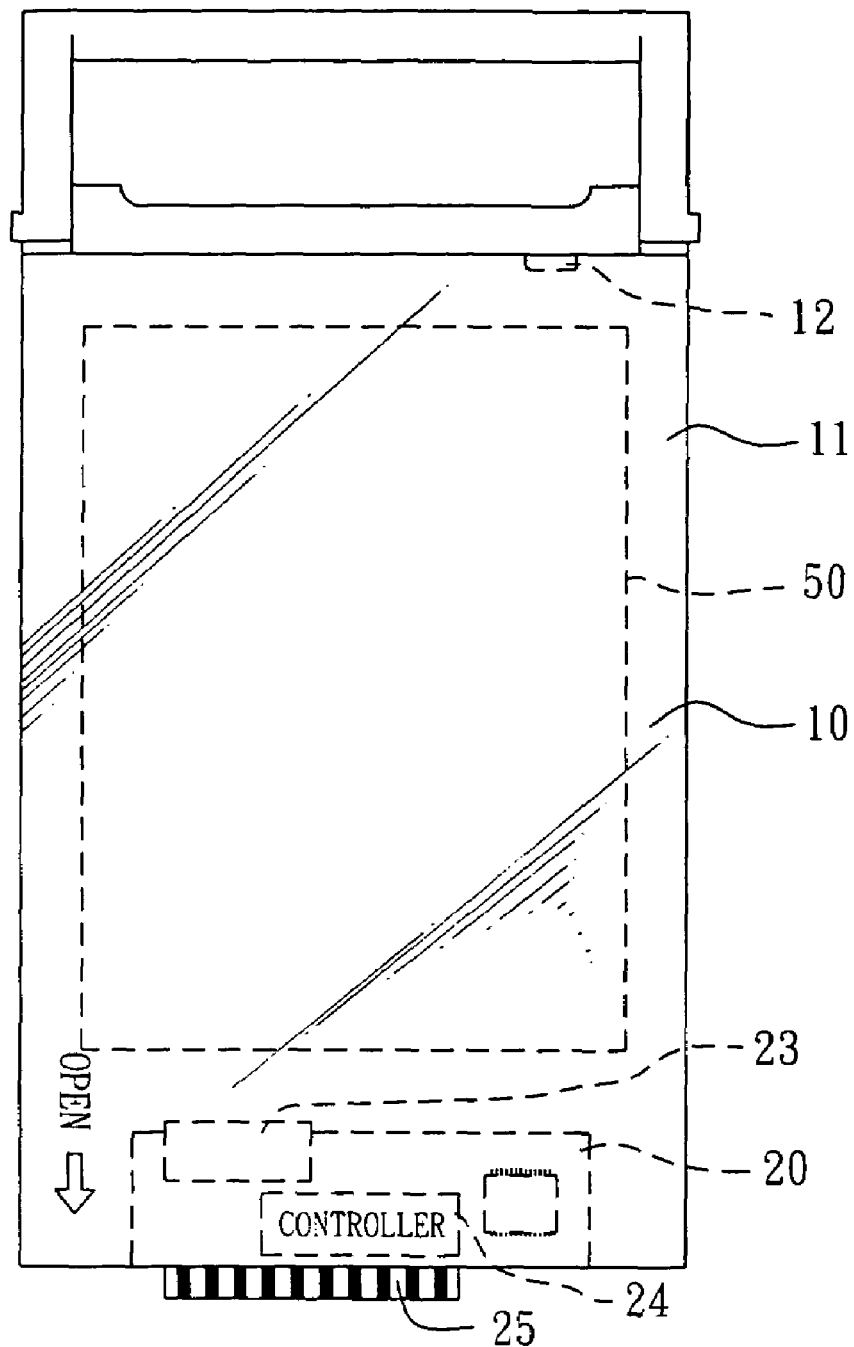
FIG. 1 illustrates a perspective drawing of the encryption removable storage system in accordance with one embodiment of the present invention.

Referring to FIG. 1, which illustrates a perspective drawing of the encryption removable storage system in accordance with one embodiment of the present invention. The encryption removable storage system of the present invention can enable different types of storage devices, such as SATA, IDE, SCSI, USB, Firewire or USIB type storage devices, to be conveniently added or removed from a computer or equipment without disassembling and reassembling the computer or equipment and with data encryption/decryption ability, so as to protect the data of the storage devices, which comprising: an enclosure portion 10; and a bridge portion 20. Wherein, the enclosure portion 10 can be added or removed from a cradle portion 30 of a computer or equipment. The cradle portion 30 is designed to have the same width and height of the drive bay of the computer or the equipment so to create a snug fit when the cradle portion 30 (please refer to FIG. 4) is installed inside a standard 5¼" drive bay (not shown in the drawing for simplicity). Once inside the drive bay, the cradle portion 30 is secured to the drive bay on the side by screws, preferably.

Wherein, the enclosure portion 10 that can be slid in and out of the cradle portion 30 for containing a storage devices 50, such as a hard disk drive and providing connection of the electrical signals of the storage devices 50, wherein, the storage devices 50 is such as SATA, IDE, SCSI, USB, Firewire or USIB type hard disk drive; especially, the SATA type hard disk drive is preferably due to its higher speed and less cable size. Wherein, the cradle portion 30 and the enclosure portion 10 are made of plastic or metal material, such as aluminum, preferably. Furthermore, the enclosure portion 10 further comprises an opening 12 disposed at its front side.

The bridge portion 20 that can be positioned inside the enclosure portion 10, and with the ability of translating a first interface into a second interface and executing data encryption/decryption function, wherein the first interface is for example but not limited to a SATA, IDE, SCSI, USB, Firewire or USIB interface of the storage devices 50, and the second interface is for example but not limited to a SATA, IDE, SCSI, USB, Firewire or USIB interface of the computer or equipment, particularly, the first interface is different to the second interface either in signals type or physical connecting type. For a non-limited example of the present invention, the bridge portion 20 can translate the signals of the first interface of the storage devices 50, such as SATA, IDE, SCSI, USB, Firewire or USIB interface, into the signals of the second interface of the computer or equipment, such as IDE interface either in signals type or physical connecting type.

Figure 2:
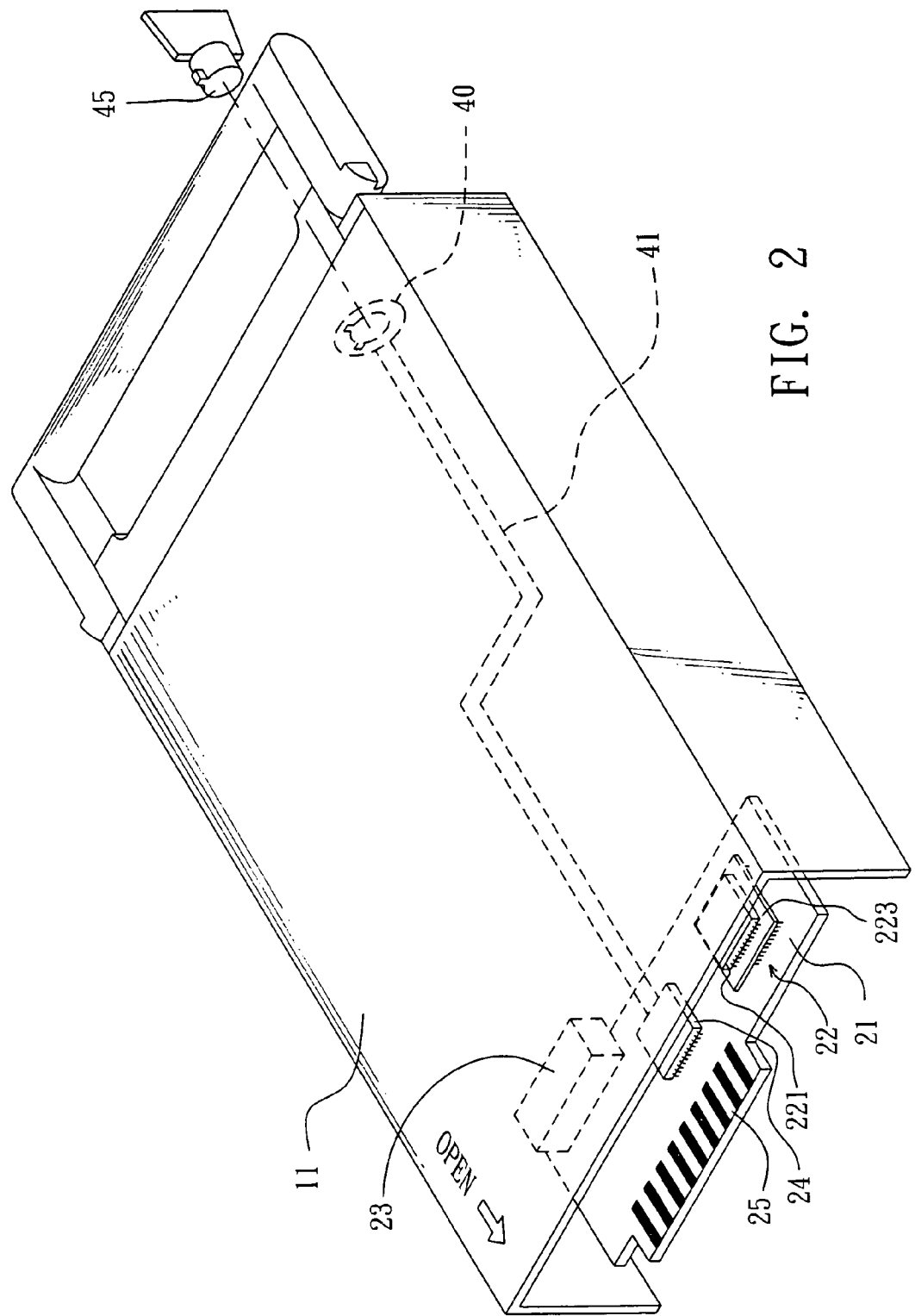
FIG. 2 illustrates an enlarge view of the enclosure portion of the encryption removable storage system in accordance with one embodiment of the present invention.

Referring to FIG. 2, which illustrates an enlarge view of the enclosure portion of the encryption removable storage system in accordance with one embodiment of the present invention. The enclosure portion 10 has a hollow space 11 to contain the storage device 50, such as a SATA, IDE, SCSI, USB, Firewire or USIB interface hard disk drive and the bridge portion 20, for the purpose of illustrating, we assume that the storage device 50 is a SATA hard disk drive. The SATA connector 51 (please refer to FIG. 4) of the hard disk drive 50 is directly connected to the SATA connector 23 of the bridge portion 20 for executing SATA interface and IDE interface translating therebetween by the ASIC board 22 (please refer to FIG. 3). While assembling the enclosure portion 10, the hard disk drive 50 is firstly positioned and fastened in the space 11, and then the connector 51 (please refer to FIG. 4) of the hard disk drive 50 is directly connected to the SATA connector 23 of the bridge portion 20.

Figure 3:
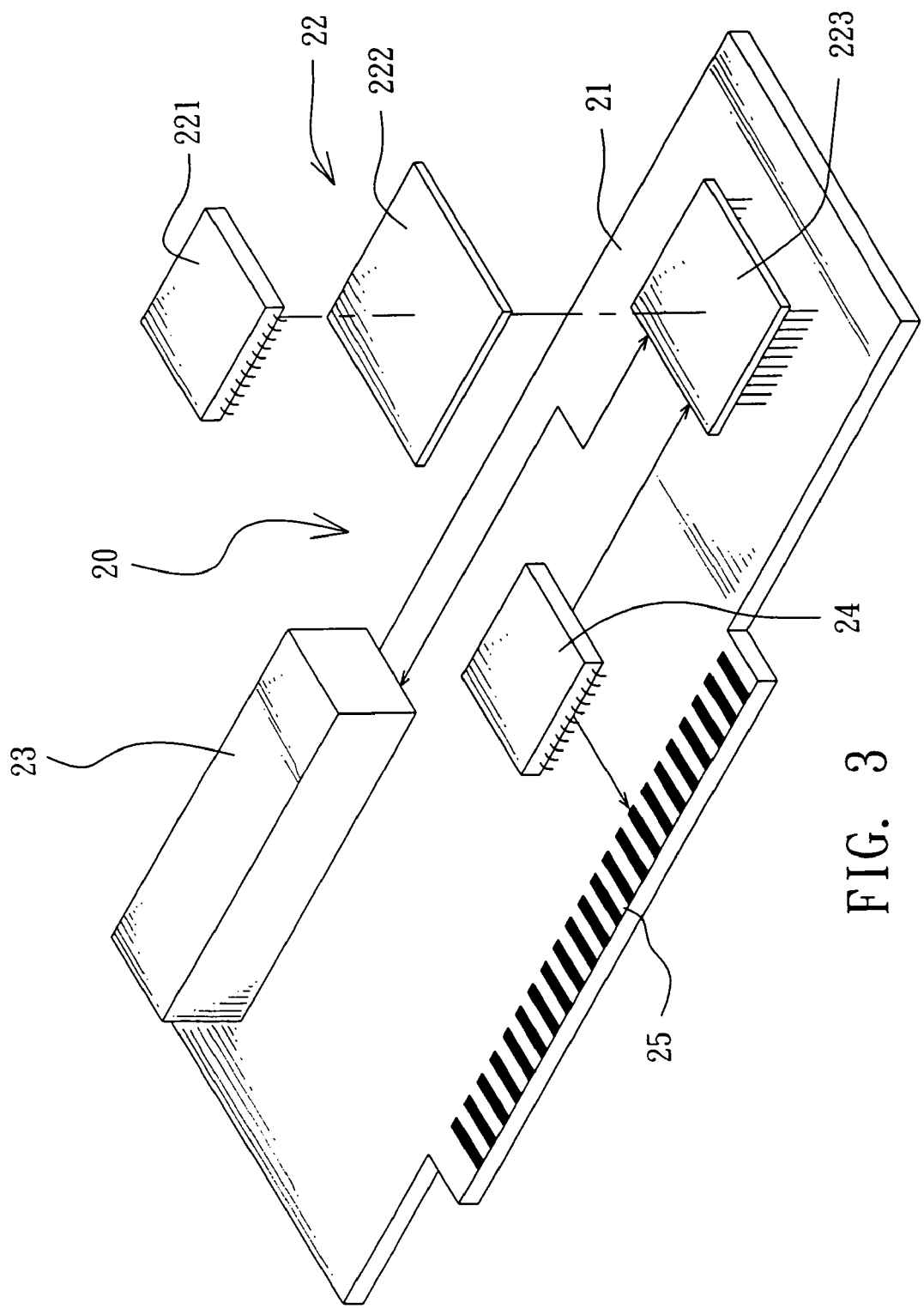
FIG. 3 illustrates the block diagram of the bridge portion in accordance with one embodiment of the present invention.

Referring to FIG. 3, which illustrates the block diagram of the bridge portion in accordance with one embodiment of the present invention. As shown in the FIG., the bridge portion 20 of the present invention further comprises: a PCB 21; an ASIC board 22; a connector 23, a controller 24 and a male gold finger 25.

The PCB 21 that can be positioned inside the space 11 of the enclosure portion 10 for conveying the ASIC board 22, connector 23 and controller 24; the ASIC board 22 can be removably mounted on the PCB 21 for translating the first interface (such as SATA) of the hard disk drive 50 into the second interface (such as IDE) for later connecting to an IDE interface on the motherboard of a computer or the control board of a equipment (not shown); the connector 23, such as a SATA, IDE, SCSI, USB, Firewire or USIB, for the purpose of illustrating, we assume that the connector 23 is a SATA connector that can be mounted on the PCB 21 and coupled to the ASIC board 22 for directly coupling the hard disk drive 50 to the ASIC board 22; the controller 24 is an Application Specification Integrated Circuit (ASIC) disposed on said printed circuit board 21 and coupled to said ASIC board 22 for receiving data from said ASIC board 22 and executing encryption/decryption operation; and the male gold finger 25 formed on the top and bottom surface of the PCB 21 and partially protruded form the PCB 21 is coupled to the controller 24 for coupling to the cradle portion 30, wherein the male gold finger 25 further comprises standard 50 IDE signals or, SATA, SCSI , USB, Firewire or USIB signals so as to conventionally inserted into the slot (figure not shown) of the cradle 30. Therefore, the computer or equipment with IDE interface can access the SATA hard disk drive 50 by using the encryption removable storage system and the data of the hard disk drive 50 can be encrypted/decrypted by the controller 24, so as to protect the data of the hard disk drive 50 form being stolen.

The ASIC board 22 further comprises an ASIC chip 221, a printed circuit board 222 and a socket 323, wherein, the ASIC chip 221 can be mounted on the top surface of the printed circuit board 222 and the socket 223 can be mounted on the bottom surface of the printed circuit board 222 so that the ASIC board 22 can be removably coupled to the printed circuit board 21 of the bridge portion 20 to execute translating according to different requirement.

The encryption removable storage system of the present invention further comprise a lock seat 40 protruded from said opening 12 and coupled to said controller 24 through wires 41; whereby a key 45 can be inserted into said lock seat 40 for controlling said controller 24 whether to execute encryption/decryption data function or not, for example, when the user switches the key 45 to an on position, the controller 24 will be enabled to execute the encryption/decryption function; when the user switches the key 45 to an off position, the controller 24 will be disabled to execute the encryption/decryption function, so the encryption removable storage system of the present invention could execute data encryption/decryption function to the hard disk drive 50 according the status of the lock seat 40. Thus the data wrote to/read from the hard disk drive 50 will be encrypted/decrypted when the encryption/decryption function of the controller is enabled by using the key 45 and the hard disk drive 50 can not be read without using the key 45 of the encryption removable storage system of the present device so as to achieve the goal of protecting the data of the hard disk drive 50.

Figure 4:
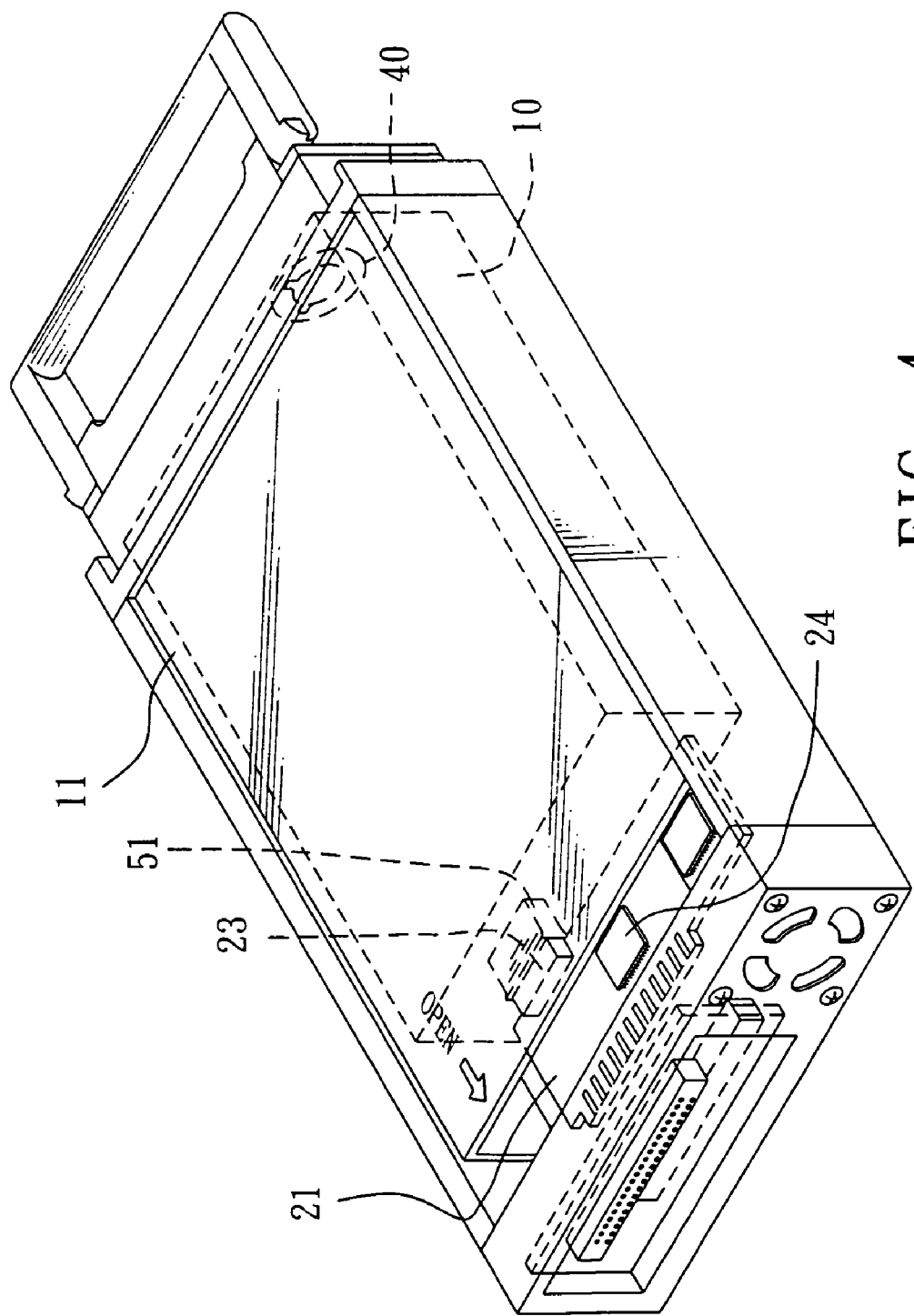
FIG. 4 illustrates an assembly appearance of the encryption removable storage system is added into a cradle portion in accordance with one embodiment of the present invention.

Referring to FIG. 4, which illustrates an assembly appearance of the encryption removable storage system is added into a cradle portion in accordance with one embodiment of the present invention. As shown in FIG., while assembling, the user can dispose the hard disk drive 50, such as a SATA type hard disk drive, into the hallow space 11 of the enclosure portion 10, then directly connect the SATA connector 51 of the hard disk drive 50 to the SATA connector 23 of the bridge portion 20, and then slide the enclosure portion 10 from outward to inward to near enough to the slot and directly plug the male gold finger 25 into the slot of the cradle portion 30, finally, insert the cradle portion 30 into a drive bay of a computer and fix it by using a plurality of screws (figure not shown) and then connect the male IDE connector 35 to the IDE interface of the motherboard of the computer or control board of a equipment. While operating, the user can turn on the lock seat 40 by using a key 45 to enable the controller 24 executing data encryption/decryption function then storing to the hard disk drive 50, thus the data stored in the hard disk drive 50 could not be read only if the user has a key 45. Therefore, the data of the hard disk drive 50 can be protected.

While the invention has been disclosed with reference to preferred embodiments thereof, it is to be understood that modifications or variations may be easily made without departing from the spirit of this invention, which is defined in the appended claims.

What is claimed is:

1. An encryption removable storage system that enables different types of storage devices to be conveniently added or removed from a cradle of a computer or equipment and with data encryption/decryption ability, which comprising:

an enclosure portion being sided in and out of said cradle portion, having a hollow space for containing said storage devices and providing a connection of electrical signals of said storage devices;

the enclosure portion comprises an opening disposed at front side of the enclosure portion;

a bridge portion being positioned inside said enclosure portion and translating a first interface into a second interface and executing data encryption/decryption function, wherein, said first interface is different from said second interface either in signal types or physical connecting types;

said bridge portion further comprises:

a printed circuit board (PCB) being disposed inside said enclosure portion;

an ASIC board being removably mounted on said PCB for translating said first interface of said storage device and said second interface therebetween;

a controller, being disposed on said PCB and coupled to said ASIC board, receiving data from said ASIC board, executing encryption or decryption operations, and generating output;

a connector, being mounted on said PCB and coupled to said ASIC board, coupling said storage device to said ASIC board; and a male gold finger being formed on top and bottom surfaces of said PCB and coupled to said controller for coupling to said cradle portion; and a lock seat being protruded from said opening and coupled to said controller through wires, whereby a key is inserted into said lock seat for controlling said controller to execute encryption /decryption data functions.

2. The encryption removable storage system according to claim 1, wherein said cradle portion being secured to a drive bay of the computer or equipment and having outside dimensions equal to inside dimensions of said drive bay is mounted permanently inside a 5¼" drive bay.

3. The encryption removable storage system according to claim 1, wherein said connector is a SATA, IDE, SCSI, USB, Firewire or USIB interface connector.

4. The encryption removable storage system according to claim 1, wherein said male gold finger further comprises IDE, SATA, SCSI, USB, Firewire or USIB signals.

5. The encryption removable storage system according to claim 1, wherein said controller is an Application Specification Integrated Circuit.

6. The encryption removable storage system according to claim 1, wherein said enclosure portion has outside dimensions equal to the inside dimensions of said cradle portion.

7. The encryption removable storage system according to claim 1, wherein said first interface is a SATA, IDE, SCSI, USB, Firewire or USIB interface.

8. The encryption removable storage system according to claim 1, wherein said second interface is a SATA, IDE, SCSI, USB, Firewire or USIB interface.

9. The encryption removable storage system according to claim 1, wherein said ASIC board further comprises an ASIC chip, a printed circuit board and a socket;

said ASIC chip being mounted on the top surface of said printed circuit board;

said socket being mounted on the bottom surface of said printed circuit board;

said ASIC board being removably coupled to said printed circuit board of said bridge portion to execute translating according to different requirement.

10. The encryption removable storage system according to claim 1, wherein said storage device is a hard disk drive.

* * * * *